United States Patent
Kim et al.

(10) Patent No.: US 11,742,905 B2
(45) Date of Patent: *Aug. 29, 2023

(54) METHOD FOR RECOVERING A FRAME THAT FAILED TO BE TRANSMITTED IN A MU-MIMO BASED WIRELESS COMMUNICATION SYSTEM

(71) Applicant: Electronics and Telecommunications Research Institute, Daejeon (KR)

(72) Inventors: Yun-Joo Kim, Suwon (KR); Jae-Seung Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,212

(22) Filed: Jun. 11, 2022

(65) Prior Publication Data

US 2022/0311483 A1    Sep. 29, 2022

Related U.S. Application Data

(63) Continuation of application No. 16/244,107, filed on Jan. 10, 2019, now Pat. No. 11,362,705, which is a
(Continued)

(30) Foreign Application Priority Data

Nov. 24, 2009  (KR) .................. 10-2009-0113869
Mar. 16, 2010  (KR) .................. 10-2010-0023423
May 17, 2010  (KR) .................. 10-2010-0046119

(51) Int. Cl.
*H04B 7/0452*   (2017.01)
*H04L 1/06*    (2006.01)
(Continued)

(52) U.S. Cl.
CPC ............. *H04B 7/0452* (2013.01); *H04L 1/06* (2013.01); *H04L 1/1685* (2013.01); *H04L 1/1848* (2013.01)

(58) Field of Classification Search
CPC ....... H04B 7/0452; H04L 1/06; H04L 1/1685; H04L 1/1848
(Continued)

(56) References Cited

U.S. PATENT DOCUMENTS 6,529,882 B1   3/2003  Park et al.
7,352,718 B1   4/2008  Perahia et al.
(Continued)

FOREIGN PATENT DOCUMENTS

EP    2 019 506 A1   1/2009
JP    2003-134139 A  5/2003
(Continued)

OTHER PUBLICATIONS

Sameer Vermani et al., "Frame Format for GroupID Management", IEEE 802.11-10/1288r1, Nov. 8, 2010, pp. 1-7.
(Continued)

*Primary Examiner* — Obaidul Huq
(74) *Attorney, Agent, or Firm* — INSIGHT LAW GROUP, PLLC; Seung Lee

(57) ABSTRACT

A method and apparatus of transmitting in a wireless communication system is provided. A transmitter generates a group management frame including a group information and position information and a data frame including a group control information having a group identifier for each of a plurality of groups. The group information indicates whether the receiver is a member of each of the plurality of groups. The position information indicates a position of at least one stream corresponding to at least one group of which the receiver is a member.

21 Claims, 6 Drawing Sheets

Related U.S. Application Data continuation of application No. 14/051,355, filed on Oct. 10, 2013, now Pat. No. 10,230,435, which is a continuation of application No. 13/479,165, filed on May 23, 2012, now Pat. No. 8,582,489, which is a continuation of application No. PCT/KR2010/008355, filed on Nov. 24, 2010.

(51) Int. Cl.
*H04L 1/1607* (2023.01)
*H04L 1/1829* (2023.01)

(58) Field of Classification Search
USPC .......................................................... 370/312
See application file for complete search history.

(56) References Cited

U.S. PATENT DOCUMENTS

| | | |
|---|---|---|
| 7,463,645 B2 | 12/2008 | Diepstraten |
| 7,701,920 B2 | 4/2010 | Takano |
| 8,532,221 B2 | 9/2013 | Liu et al. |
| 8,582,489 B2 | 11/2013 | Kim et al. |
| 8,599,804 B2 | 12/2013 | Erceg et al. |
| 8,605,692 B2 | 12/2013 | Kim et al. |
| 8,787,328 B2 | 7/2014 | Kang et al. |
| 8,848,680 B2 | 9/2014 | Lee et al. |
| 8,917,743 B2 | 12/2014 | Zhu et al. |
| 8,937,912 B2 | 1/2015 | Mazet et al. |
| 8,948,102 B2 | 2/2015 | Seok |
| 8,948,150 B1 | 2/2015 | Zhang et al. |
| 8,989,158 B2 | 3/2015 | Seok |
| 8,989,161 B2 | 3/2015 | Kim et al. |
| 9,113,479 B2 | 3/2015 | Seok |
| 9,025,544 B2 | 5/2015 | Kim et al. |
| 9,107,099 B2 | 8/2015 | Erceg et al. |
| 9,197,298 B2 | 11/2015 | Kim et al. |
| 9,369,918 B2 | 6/2016 | Grandhi |
| 9,526,114 B2 | 12/2016 | Seok |
| 9,564,999 B2 | 2/2017 | Kim |
| 2004/0054655 A1 | 3/2004 | Brown |
| 2004/0229624 A1 | 11/2004 | Cai et al. |
| 2005/0141420 A1 | 6/2005 | Li et al. |
| 2005/0147023 A1 | 7/2005 | Stephens et al. |
| 2005/0233776 A1 | 10/2005 | Allen et al. |
| 2005/0272441 A1 | 12/2005 | Bates |
| 2006/0078001 A1 | 4/2006 | Chandra et al. |
| 2006/0140186 A1 | 6/2006 | LoGalbo et al. |
| 2006/0239213 A1 | 10/2006 | Frederiks et al. |
| 2006/0252443 A1 | 11/2006 | Sammour et al. |
| 2007/0127478 A1 | 6/2007 | Jokela et al. |
| 2007/0147284 A1 | 6/2007 | Sammour et al. |
| 2007/0153830 A1 | 7/2007 | Xhafa et al. |
| 2007/0263528 A1 | 11/2007 | Mukherjee |
| 2008/0002636 A1 | 1/2008 | Gaur et al. |
| 2008/0062178 A1 | 3/2008 | Khandekar et al. |
| 2008/0089354 A1 | 4/2008 | Yoon et al. |
| 2008/0146253 A1 | 6/2008 | Wentink |
| 2008/0181161 A1 | 7/2008 | Gi Kim et al. |
| 2009/0031185 A1 | 1/2009 | Xhafa et al. |
| 2009/0040990 A1 | 2/2009 | Xhafa et al. |
| 2009/0059792 A1 | 3/2009 | Itoh |
| 2009/0067438 A1 | 3/2009 | Tsukamoto |
| 2009/0141726 A1 | 6/2009 | Fang et al. |
| 2009/0154418 A1 | 6/2009 | Kang et al. |
| 2009/0296619 A1 | 12/2009 | Sammour et al. |
| 2010/0067409 A1 | 3/2010 | Takano |
| 2010/0220813 A1 | 9/2010 | Abraham et al. |
| 2010/0238850 A1 | 9/2010 | Abraham et al. |
| 2010/0310003 A1* | 12/2010 | Lauer ............... H04L 1/0065 375/267 |
| 2011/0002219 A1 | 1/2011 | Kim et al. |
| 2011/0096797 A1* | 4/2011 | Zhang ............... H04B 7/0669 370/474 |
| 2011/0103280 A1 | 5/2011 | Liu et al. |
| 2011/0110351 A1 | 5/2011 | Seok |
| 2011/0110454 A1 | 5/2011 | Sampath et al. |
| 2011/0128900 A1 | 6/2011 | Seok |
| 2012/0002634 A1 | 1/2012 | Seok |
| 2012/0014336 A1 | 1/2012 | Seok |
| 2012/0120931 A1 | 5/2012 | Abraham et al. |
| 2012/0153483 A1 | 6/2012 | Akolkar et al. |
| 2012/0230242 A1 | 9/2012 | Kim et al. |
| 2012/0320837 A1 | 12/2012 | Kim et al. |
| 2013/0157578 A1 | 6/2013 | Nanda et al. |

FOREIGN PATENT DOCUMENTS

| | | |
|---|---|---|
| JP | 2005-229448 A1 | 8/2005 |
| JP | 2005-529403 A2 | 9/2005 |
| JP | 2007-214856 A2 | 8/2007 |
| JP | 2007-286922 A1 | 11/2007 |
| JP | 2008-502275 A1 | 1/2008 |
| JP | 2008-517518 A | 5/2008 |
| JP | 2008-278455 A1 | 11/2008 |
| JP | 2008-539665 A2 | 11/2008 |
| JP | 2009-528745 A | 8/2009 |
| JP | 2016-189602 A | 11/2016 |
| KR | 10-2001-0045237 A1 | 6/2001 |
| KR | 10-2002-0079793 A | 10/2002 |
| KR | 10-2005-0059304 A1 | 6/2005 |
| KR | 10-2008-0006602 A2 | 1/2006 |
| KR | 10-2006-0045799 A2 | 5/2006 |
| KR | 10-2006-0081329 A | 7/2006 |
| KR | 10-2009-0012199 A1 | 2/2009 |
| KR | 10-2010-0050633 A | 5/2010 |
| WO | 2005/002141 A1 | 1/2005 |
| WO | 2006/043773 A1 | 4/2006 |
| WO | WO 2006/043773 A1 | 4/2006 |
| WO | 2006/115999 A2 | 11/2006 |
| WO | WO 2006/115999 A2 | 11/2006 |
| WO | WO 2007/099436 A2 | 9/2007 |
| WO | WO 2008/033860 A | 3/2008 |
| WO | WO 2008/080279 A1 | 7/2008 |
| WO | WO 2008/104095 A | 9/2008 |
| WO | WO 2009/114379 A1 | 9/2009 |
| WO | WO 2011/056790 A1 | 5/2011 |
| WO | WO 2011/057009 A2 | 5/2011 |

OTHER PUBLICATIONS

Joonsuk Kim et al., "GroupID in VHT-SIG Field", IEEE 802.11-10/0582r0, May 17, 2010, pp. 1-5.

Joonsuk Kim et al., "GroupID Concept for Downlink MU-MIMO Transmission", IEEE 802.11-10/0073r0, Jan. 18, 2010, pp. 1-8.

Hrishikesh Gossain et al., "Supporting MAC Layer Multicast in IEEE 802.11 based MANETs: Issues and Solutions", Proceedings of the 29.sup.th Annual IEEE Internatonal Conference on Local Computer Networks, 2004, IEEE Computer Society.

International Search Report for PCT/KR2010/008355 dated Nov. 24, 2010.

Xiaoli Wang et al., "Supporting MAC Layer Multicast in IEEE 802.11n: Issues and Solutions", IEEE Communications Society, WCNC 2009 proceedings, 2009, IEEE.

International Search Report for PCT/KR2010/008351 dated Nov. 24, 2010.

Office Action for U.S. Appl. No. 13/478,069 dated Aug. 1, 2012.

Chi-Hsiang Yeh, "Media Access Control for Real-time Communications in Consumer Electronics Networks", International Conference on New Trends in Information and Service Science, 2009, pp. 715-718, IEEE.

James Gross et al., "Dynamic Multi-user OFDM for 802.11 systems", Jul. 15, 2007, IEEE, Berlin.

Mohamed Kamoun et al., "Efficient backward compatible allocation mechanism for multi user CSMA/CA schemes", 2009, IEEE.

European Search Report for Application No. EP 10 83 3555 dated Oct. 10, 2012.

International Search Report for PCT/KR2010/008361 dated Nov. 24, 2010.

Office Action and List of References for U.S. Appl. No. 13/478,069 dated Aug. 1, 2012.

(56) References Cited

OTHER PUBLICATIONS

Office Action and List of References for U.S. Appl. No. 13/478,069 dated Feb. 5, 2013.
Office Action and List of References for U.S. Appl. No. 13/478,069 dated May 30, 2013.
European Search Report for EP Application No. 15157776.4 dated Jun. 17, 2015.
Guido R. Hiertz et al., "Mesh Networks Alliance Proposal", IEEE, Nov. 7, 2005, pp. 1-46, vol. 802.11.
Non-final Office Action and list of references for U.S. Appl. No. 14/633,036 dated Jul. 13, 2017.
Notice of Allowance and list of references for U.S. Appl. No. 14/633,036 dated Mar. 30, 2017.
Non-final office action and list of references dated Oct. 2, 2012 for U.S. Appl. No. 13/479,165.
Non-final office action and list of references dated Mar. 6, 2013 for U.S. Appl. No. 13/479,165.
Notice of allowance and list of references dated Jul. 10, 2013 for U.S. Appl. No. 13/479,165.
Notice of allowance and list of references dated Sep. 20, 2013 for U.S. Appl. No. 13/479,165.
Notice of allowance and list of references dated Jan. 29, 2018 for U.S. Appl. No. 14/633,036.
Notice of allowance and list of references dated Nov. 14, 2014 for U.S. Appl. No. 13/478,069.
Notice of allowance and list of references dated Jan. 30, 2015 for U.S. Appl. No. 13/478,069.
Non-final office action and list of references dated Jan. 17, 2014 for U.S. Appl. No. 13/511,363.
Notice of allowance and list of references dated Jun. 13, 2014 for U.S. Appl. No. 13/511,363.
U.S. Appl. No. 13/479,165, filed May 23, 2012 (issued as U.S. Pat. No. 8,582,489 dated Nov. 12, 2013).
U.S. Appl. No. 14/633,036, filed Feb. 26, 2015 (issued as U.S. Pat. No. 9,929,784 dated Mar. 27, 2018).
U.S. Appl. No. 13/478,069, filed Feb. 22, 2012 (issued as U.S. Pat. No. 8,989,161 dated Mar. 24, 2015).
U.S. Appl. No. 15/293,258, filed Oct. 13, 2016 (reissue of U.S. Pat. No. 8,861,495).
U.S. Appl. No. 13/511,363, filed May 22, 2012 (issued as U.S. Pat. No. 8,861,495 dated Oct. 14, 2014).
U.S. Appl. No. 15/937,590, filed Mar. 27, 2018.
U.S. Appl. No. 14/051,355, filed Oct. 10, 2013 (issued as U.S. Pat. No. 10,230,435 dated Mar. 12, 2019).
Hongyuan Zhang et al., "802.11ac Preamble", IEEE 802.11-10/0070r0, Jan. 18, 2010, Slides 1-11.
Trial Decision (affirming patent office's decision to reject) issued Jan. 15, 2019 for Korean Application No. 10-2016-0083526.
Notice of Allowance dated Nov. 22, 2017 for U.S. Appl. No. 14/633,036.
Non-final Office Action dated May 21, 2015 for U.S. Appl. No. 14/051,355.
Final Office Action dated Dec. 30, 2015 for U.S. Appl. No. 14/051,355.
Non-final Office Action dated Sep. 8, 2016 for U.S. Appl. No. 14/051,355.
Final Office Action dated Apr. 13, 2017 for U.S. Appl. No. 14/051,355.
Non-final Office Action dated Nov. 16, 2017 for U.S. Appl. No. 14/051,355.
Notice of Allowance dated May 17, 2018 for U.S. Appl. No. 14/051,355.
Notice of Allowance dated Oct. 11, 2018 for U.S. Appl. No. 14/051,355.
Notice of Allowance dated Oct. 30, 2018 for U.S. Appl. No. 14/051,355.
Notice of Allowance dated Dec. 30, 2018 for U.S. Appl. No. 14/051,355.
Notice of Allowance dated Feb. 8, 2019 for U.S. Appl. No. 14/051,355.
Non-final office action dated Aug. 7, 2019 for U.S. Appl. No. 15/937,590.
Non-final office action and list of references dated Sep. 27, 2019 for U.S. Appl. No. 15/293,258.
Notice of Allowance dated Feb. 26, 2020 for U.S. Appl. No. 15/937,590.
Robert Novak, et al., Proposal for IEEE 802.16m VoIP Resource Allocation and Control Structure, IEEE C802.16m-08/177, Mar. 10, 2008.
Shweta Shrivastava et al., Additional material related to the Recommended AWD Text Proposal #8 in C802.16m-09/0558 (Group Scheduling), IEEE C802.16m-09/0700, Mar. 7, 2009.
Final office action dated May 18, 2020 for U.S. Appl. No. 15/293,258.
Notice of allowance dated Jul. 1, 2020 for U.S. Appl. No. 15/937,590.
Non-final office action dated Oct. 28, 2019 for U.S. Appl. No. 16/244,107.
Final office action dated Jun. 4, 2020 for U.S. Appl. No. 16/244,107.
Non-final office action dated Dec. 1, 2020 for U.S. Appl. No. 16/244,107.
Final office action dated Jun. 25, 2021 for U.S. Appl. No. 16/244,107.
Notice of Allowance dated Feb. 18, 2022 for U.S. Appl. No. 16/244,107.
Non-Final Office Action dated Apr. 5, 2021 for U.S. Appl. No. 15/293,258.
Final Office Action dated Nov. 10, 2021 for U.S. Appl. No. 15/293,258.
Advisory Action dated Apr. 1, 2022 for U.S. Appl. No. 15/293,258.
Non-Final Office Action dated Jun. 22, 2022 for U.S. Appl. No. 15/293,258.
Notice of Allowance dated Oct. 27, 2022 for U.S. Appl. No. 15/293,258.
Notice of Allowance dated Jan. 12, 2023 for U.S. Appl. No. 15/293,258.

\* cited by examiner

METHOD FOR RECOVERING A FRAME THAT FAILED TO BE TRANSMITTED IN A MU-MIMO BASED WIRELESS COMMUNICATION SYSTEM

CROSS REFERENCE TO RELATED APPLICATION

The present application is a continuation of U.S. application No. 16/244,107 (now pending), which is a continuation of U.S. patent application Ser. No. 14/051,355 (now U.S. Pat. No. 10,230,435), filed on Oct. 10, 2013, which is a continuation of U.S. patent application Ser. No. 13/479,165 (now U.S. Pat. No. 8,582,489), filed on May 23, 2012, which is a continuation of PCT/KR2010/008355, filed on Nov. 24, 2010, which claims the benefit of Korean Patent Application No. 10-2010-0046119, filed on May 17, 2010, Korean Patent Application No. 10-2010-0023423, filed on Mar. 16, 2010, and Korean Patent Application No. 10-2009-0113869, filed on Nov. 24, 2009, which are hereby incorporated by reference in their entirety into this application.

TECHNICAL FIELD

Exemplary embodiments of the present invention relate to a method for recovering a transmission-failed frame in wireless communication system; and, more particularly, to a method for recovering a frame, which has failed to be transmitted, among frames transmitted to a plurality of wireless stations using a group number in a wireless communication system based on MU-MIMO (Multi-User Multiple Input Multiple Output).

BACKGROUND ART

A WLAN basically supports a BSS (Basic Service Set) consisting of an AP (Access Point), which serves as the point of access of a DS (Distributed System), and a plurality of wireless STAs (STAtions) other than the AP.

The MAC (Medium Access Control) protocol of the WLAN operates based on CSMA/CA (Carrier Sense Multiple Access/Collision Avoidance). Therefore, the WLAN involves resource wasting in the course of channel contention. In order to alleviate this problem, IEEE 802.11 Workgroup 'e' has defined an enhanced MAC protocol, which proposes that, when a radio resource transmission right is acquired, multiple MPDUs are transmitted using SIFS (Short Inter-Frame Space) during a TXOP (Transmission Opportunity), and block ACKs are received in response thereto (i.e. burst transmission).

Furthermore, IEEE 802.11 Workgroup 'n' has defined an A-MSDU (Aggregated MSDU) and an A-MPDU (Aggregated MDPU). At least one MSDU (which is a transmission unit) or at least one MPDU is aggregated even without IFS, and is transmitted in the process of one-time radio resource contention.

Recent surge in the number of WLAN users is followed by standardization regarding VHT (Very High Throughput) WLAN systems by IEEE 802.11 Workgroup 'ac' as an attempt to increase data throughput provided by each BSS.

A VHT WLAN system supports, in a multiple (three)-STA environment consisting of one AP and two STAs, maximum throughput of 1 Gbps at the MAC SAP of the AP, as well as maximum throughput of 500 Mbps at the MAC SAP of a wireless STA for point-to-point environments. There is also consideration made so that each AP and STA of the VHT WLAN simultaneously supports compatibility with existing WLAN (IEEE 802.11a/n system).

Meanwhile, when a wireless STA acquires a TXOP in a wireless communication system (e.g. WLAN), the STA needs to receive a response through a response frame regarding a request frame in order to improve reliability of wireless communication. For example, frames requiring responses include a RTS (Request-To-Send) frame, a BAR (Block ACK Request) frame, a data frame, and frames for various requests (e.g. probe request, authentication request, association request). Response frames responding to the frames requiring responses are as follows: a response frame responding to a RTS frame is a CTS (Clear-To-Send) frame; a response frame responding to a BAR frame is a BA (Block ACK) frame; a response frame responding to a data frame is an ACK or BA frame; and response frames responding to various request frames are frames of various responses (e.g. probe response, authentication response, association response).

The responses are classified into immediate responses and delayed responses. Responses (ACK frames) to a single piece of data correspond to the immediate responses; and block responses responding to a continuous transmission or aggregated MPDU correspond to both immediate and delayed responses.

An immediate response is used in the following manner: when PHY-RXEND.primitive of a received request frame is generated, a response frame is transmitted after SIFS so that other wireless STAs do not transmit. In this case, the frame exchange sequence constitutes a pair, as described above. The generated response frame may not include a transmission address.

On the other hand, a delayed response is used in the following manner: a response is made through an ACK frame as a basic response for informing of whether an initially generated request frame has been received or not, and a response frame including requested information is then transmitted. The response frame in this case may be transmitted through EDCA (Enhanced Distributed Channel Access) regarding channels, piggybacked by another frame, or aggregated and transmitted together with another frame. According to the delayed response scheme, a transmitting STA receives a response frame from a receiving STA and then informs the receiving STA that the response frame has been received using an ACK frame.

The request and response frame exchange sequence in such a WLAN may be applied to a multiple user wireless communication system. When uplink MU-MIMO technology is supported, wireless STAs can receive frames according to the above-mentioned frame exchange sequence and simultaneously transmit response frames after IFS.

When uplink MU-MIMO technology is not supported, or when better throughput is desired even if uplink MU-MIMO technology is supported, a wireless STA, after receiving a frame, needs to transmit a response frame using a difference of channel or time.

Schemes for exchanging frames using a difference of time but the same bandwidth in a WLAN system include a scheme of exchanging a request frame eliciting response frames and a response frame through channel access for each wireless STA, and a scheme of transmitting, by a plurality of wireless STAs, subsequent response frames through a single request frame.

To be specific, the scheme of exchanging a request frame eliciting response frames and a response frame through channel access for each wireless STA is as follows: an AP transmits a request frame to a first wireless STA through channel access; the first wireless STA transmit a response frame after SIFS; the AP transmits another request frame to a second wireless STA through channel access; and the second wireless STA transmits a response frame after SIFS.

The scheme of transmitting, by a plurality of wireless STAs, subsequent response frames through a single request frame is as follows: a single request frame including address information regarding multiple users is transmitted through channel access, and the wireless STAs then subsequently transmit response frames after SIFS.

IEEE 802.11 standards recommend that, in order to avoid collision between frames on a wireless path, control frames are transmitted to be receivable by all STAs belonging to the corresponding BSS. In a MU-MIMO-based VHT WLAN system, control frames need to be transmitted to be receivable by all STAs, even if a plurality of communication paths are used. The control frames in this connection include RTS, CTS, ACK, BAR, BA, and various poll frames.

When a plurality of communication paths are used simultaneously, STAs receiving control frames may have one-to-one correspondence to respective communication paths, meaning that that a control frame must be transmitted through each communication path. However, this increases the rate of overhead concerning transmission/reception of control frames, degrading the advantage of using MU-MIMO technology.

DISCLOSURE

Technical Problem

An embodiment of the present invention is directed to a method for grouping a plurality of wireless STAs and transmitting frames, in order to transmit control and data frames efficiently in a wireless communication system using MU-MIMO technology, so that when a frame fails to be transmitted, the transmission-failed frame can be recovered effectively.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a method for recovering a response frame, which has failed to be received normally, among response frames to be received from a plurality of wireless stations in a wireless communication system using multi-user multiple input multiple output technology includes: (a) transmitting a frame requiring a response and containing group control information for designating the wireless stations as recipients; (b) subsequently receiving first response frames from the wireless stations in response to the frame requiring a response; (c) transmitting, when the first response frame fails to be received normally from a specific wireless station in the step (b), a request frame having a wireless station, from which the first response frame has failed to be received, as a recipient after expiration of time for receiving the first response frames from all of the wireless stations constituting a group; and (d) receiving a second response frame in response to the request frame of the step (c).

In accordance with another embodiment of the present invention, a method for recovering a response frame, which has failed to be received normally, among response frames to be received from a plurality of wireless stations in a wireless communication system using multi-user multiple input multiple output technology includes: (a) transmitting a frame requiring a response and containing group control information for designating the wireless stations as recipients; (b) subsequently receiving first response frames from the wireless stations in response to the frame requiring a response; (c) transmitting, when the first response frame fails to be received normally from a specific wireless station in the step (b), request frames having wireless stations as recipients ranging from the wireless station, from which the first response frame has failed to be received, to the last wireless station based on an order of transmitting the first response frames; and (d) receiving at least one second response frame in response to the request frame of the step (c).

The group control information may include at least one of a group sequence number uniquely assigned to each group, bitmap information indicating whether wireless stations constituting a group have received or not, and stream information regarding multiple antennas.

The request frame may include the group sequence number and bitmap information having a bit set to indicate a reception state of a wireless station from which the first response frame has failed to be received.

The request frame may include the group sequence number and bitmap information having bits set to indicate reception states of wireless stations ranging from the wireless station from which the first response frame has failed to be received to the last wireless station.

The group control information may be recorded in a receiving station address field of the frame requesting a response or the request frame.

The request frame may be a BAR (Block ACK Request) frame, the second response frame may be a BA (Block ACK) frame, and the BAR frame may include group information and receiving station information.

The group information may be recorded in a receiving station address field of the BAR frame, and the receiving station information may be recorded in a BAR information field of the BAR frame.

Advantageous Effects

According to the present invention, group sequence numbers are allocated to a plurality of wireless STAs to group them, and the group sequence numbers are used to transmit frames to the wireless STAs. When transmission of any of multiple frames using such group sequence numbers fails, efficient recover of the transmission-failed frame is supported. As such, the present invention substantially improves frame transmission efficiency in a system using MU-MIMO technology.

BEST MODE FOR THE INVENTION

Figure 1:
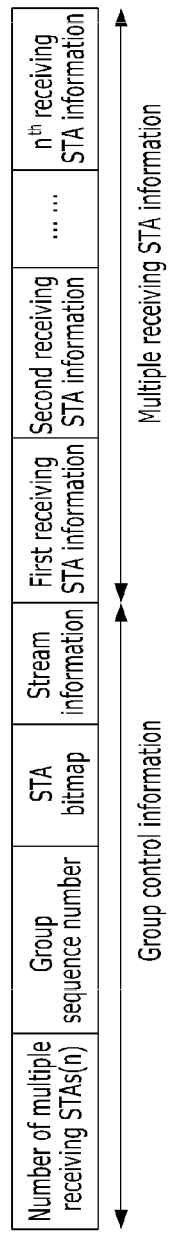
FIG. 1 illustrates the structure of a group control frame in accordance with the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention will hereinafter be described with reference to a wireless communication system, among various types of high-speed wireless communication systems, to which MU-MIMO technology is applied based on a wireless communication system defined by IEEE 802.11. However, those skilled in the art can understand that the present invention is applicable to any environment using multiple channels or any wireless communication environment using MU-MIMO technology.

A frame transmitted using MU-MIMO technology needs to include information regarding multiple users' receiving STAs. Methods for configuring multiple receiving STA information in a frame include a method of carrying a list of multiple users' receiving addresses inside the transmitted frame, a method of carrying a group address inside the transmitted frame, and a method of carrying, inside the transmitted frame, group control information including a group sequence number, bitmap information, and stream information so as to indicate a group and whether a wireless STA has received or not.

Prior to describing a method for recovering a frame that has failed to be transmitted, a method for transmitting multiple frames using group control information will now be described.

FIG. 1 illustrates the structure of a group control frame for group control information allocation in accordance with the present invention.

The group control information includes the number of multiple receiving STAs, a group sequence number uniquely allocated to a group, bitmap information (STA bitmap) indicating whether reception has occurred or not regarding wireless STAs constituting multiple users, and stream information. The multiple receiving STA information includes receiving STA information, the number of which corresponds to that of the multiple receiving STAs.

The number of multiple receiving STAs indicates the number of STAs designated as a group, and is not a necessary component, but an optional one.

The group sequence number refers to a unique number managed by each AP to group wireless STAs existing inside a BSS, and may have a length of 6 bits, for example. If group numbers corresponding to 1-64 can be expressed as a combination of bitmap information and stream information, the group sequence number may be omitted. In other words, the group's unique number may be expressed as the location of at least one piece of group control information obtained by coupling each bitmap information and stream information. When a group sequence number is used in a transmitted frame, group control information (e.g. bitmap information and stream information) lying at a location corresponding to an arbitrary group sequence number is included in the transmitted frame.

The STA bitmap information indicates whether each STA has received or not according to the field order of n receiving STA information. For example, when the number of multiple receiving STAs is four (n=4), bitmap information "1101" indicates that frames are transmitted receiving STAs 1, 2, and 4. Therefore, each STA, in the process of having group control information allocated thereto, uses the address in the receiving STA information field to recognize its location on the bitmap.

When one wireless STA is informed of a group sequence number to which it belongs, i.e. when there is one wireless STA corresponding to a group sequence number, 1-bit information (i.e. '1' or '0') is used to inform of whether reception occurred or not. When a STA belongs to a plurality of groups, which are described using a group sequence number, the STA bitmap information may be used to inform of whether reception has occurred or not regarding the corresponding group.

The stream information is used to indicate a stream location of a transmitting antenna in MU-MIMO environment. Specifically, the stream information indicates, when the AP uses four antennas, which of the four antennas is used to transmit a frame. Therefore, a receiving STA can know the location of a stream to receive based on the stream information. The stream information may include information regarding each of as many as a streams. Alternatively, when as many as a streams are classified into b groups, the value of b indicates the receiving location.

The receiving STA information includes receiving STA's address information. Besides the receiving STA's address information, the receiving STA information may further include QoS information and MCS information. The receiving STA address may be a MAC address of an association ID.

Such a group control frame may be transmitted to a plurality of wireless STAs according to a broadcasting method. Alternatively, the group control frame may be transmitted to each wireless STA according to a unicast method. In the latter case, the group control frame may only include a group sequence number, its own bitmap information, and stream information.

A frame, which is transmitted after group control information regarding a plurality of wireless STAs has been completely allocated, only includes a group sequence number, STA bitmap information, and stream information. As a result, each wireless STA uses the allocated group sequence number and bitmap information to recognize the recipient, and uses the stream information to receive a signal.

Meanwhile, one wireless STA may have at least one piece of group control information allocated thereto. Specifically, the group control frame may include bitmap information regarding a wireless STA corresponding to each of at least one group sequence number, as well as stream information. The same frame format illustrated in FIG. 1 is used even when one wireless STA has a plurality of pieces of group control information allocated thereto.

Figure 2:
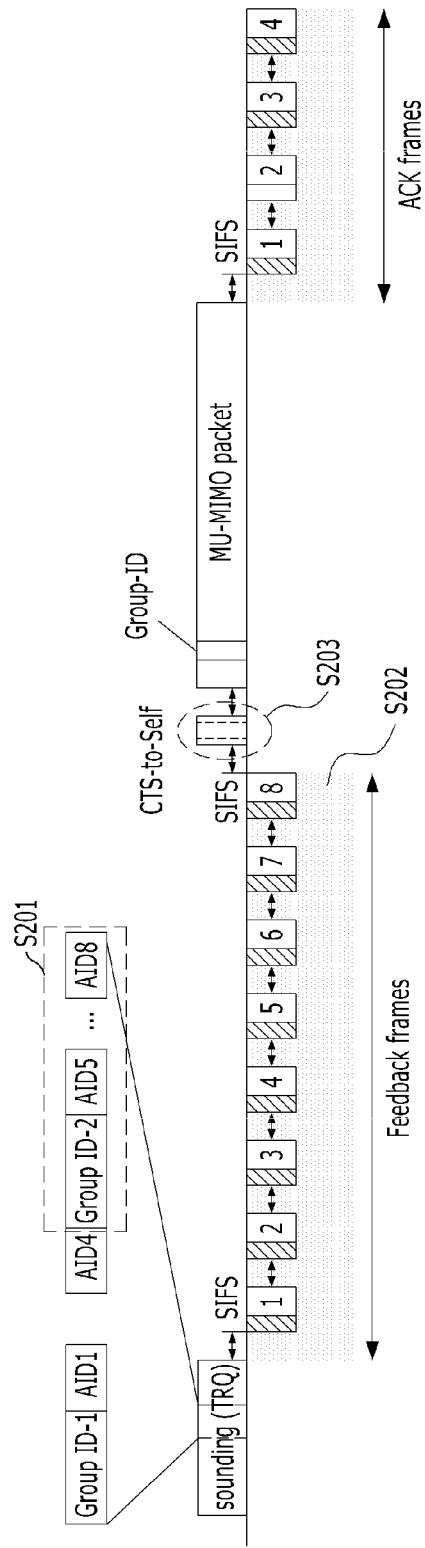
FIG. 2 illustrates the overall operation of a WLAN using a group number in accordance with the present invention.

FIG. 2 illustrates the overall operation of a WLAN using a group number in accordance with the present invention. The group number may be a group ID or a group sequence number.

When a group number is used, the overall operation of a WLAN includes a step of defining a group number and negotiating or allocating it, a step of requesting sounding information and responding, a step of transmitting MU-MIMO data, and a step of responding to the MU-MIMO data. Exchange of RTS/CTS frames in this case can be performed when channel protection is considered necessary, e.g. before sounding or before the step of transmitting MU-MIMO data.

When the step of defining a group number and negotiating or allocating it is performed concurrently with the step of performing sounding, a frame transmitted for this needs to include at least one purpose, meaning that it is substantially ineffective in connection with operation control and loss. Therefore, the step of defining a group number and negotiating or allocating it and the step of performing sounding are rather performed independently than concurrently. It will be assumed in the following description of the present invention that the step of defining a group number and negotiating or allocating it is performed independent from the sounding step when wireless STAs within the BSS need to be grouped.

FIG. 2 illustrates the overall operation of a WLAN system based on an assumption that four receiving STAs' AIDs are used to designate a group, and the system has two groups.

Referring to FIG. 2, a group number (group ID or group sequence number) is defined, and the group number is designated to each STA through negotiation, or an arbitrary group number is allocated, and the group number is used to request sounding at step S201.

In response to the sounding request, each wireless STA transmits an ACK frame based on the schedule after SIFS, so as to perform feedback in response to the sounding request, at step S202.

After receiving a response frame from the last wireless STA in response to the sounding request, the AP, after SIFS, transmits a CTS-to-Self frame as a NAV distribution process before transmitting a MU-MIMO data frame, at step S203. The CTS-to-Self frame includes group control information that has been updated based on feedback information received in the previous sounding process. The group control information is updated based on each wireless STA's channel information, which is included in the feedback information, or network configuration information (e.g. connection/disconnection).

Such a CTS-to-Self frame informs a receiving MAC, including a wireless STA that has not partaken in reception, of the response order, and a wireless STA supposed to receive data uses the response order information to calculate the time to transmit a response frame.

After NAV distribution is completed, the AP transmits a MU-MIMO data frame, including a group number, to a plurality of wireless STAs and, after SIFS, receives a response frame (ACK frame) from each wireless STA in response to the transmitted data frame.

The updated group control information may be transmitted while being contained not only in the CTS-to-Self frame, but also in a control frame of a MAC level, which can be decoded by all wireless STAs including legacy wireless STAs. Alternatively, the updated group control information may include information regarding whether a wireless STA has received at least one different piece of group information, as well as stream information, and provided to each wireless STA as a management frame in a broadcasting or unicast type.

A case of a group control frame transmitted to a plurality of wireless STAs in a broadcasting type will now be described.

When a STA receives a group control frame, it determines that it is the destination of the transmitted group control frame if its address is included in the receiving STA information field and if the bit corresponding to it inside the wireless STA bitmap is set to '1'. Then, wireless STAs transmit a response (ACK frame) to the group control frame after SIFS. Each STA performs a response subsequently.

An exemplary method for subsequently responding by respective wireless STAs is as follows: Each wireless STA transmits an ACK frame after a period of time obtained by multiplying the sum of ACK frame transmission time and SIFS by the number of bits in the STA bitmap, which precede its turn and which is set as '1'. In other words, a wireless STA transmits an ACK frame after all wireless STAs that have a bit value of '1' in the bitmap before its turn have transmitted ACK frames.

Figure 3:
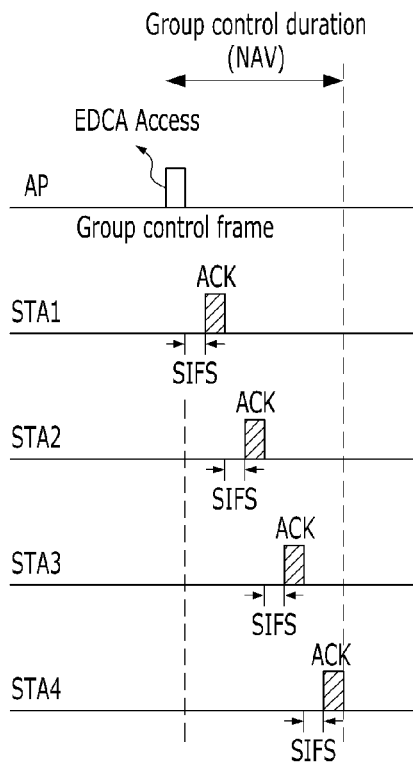
FIG. 3 illustrates a method for transmitting a group control information frame in accordance with the present invention.

FIG. 3 illustrates a method for transmitting a group control frame in accordance with the present invention.

Referring to FIG. 3, four wireless STAs constitute a group, and the bitmap consists of four bits. The AP constructs a group control frame including a group sequence number, wireless STA bitmap information, stream information, and receiving STA information, and sets a NAV protection value in order to safely receive ACK frames from multiple users consisting of four wireless STAs.

Referring to FIG. 3, each wireless STA transmits an ACK frame at its turn to respond to the group control frame. When a wireless STA has responded at its turn, the AP designates the corresponding bit of the bitmap as '1' during MU-MIMO data frame transmission. However, when a wireless STA has not responded, the AP designates the corresponding bit of the bitmap as '0' during MU-MIMO data frame transmission.

Figure 4:
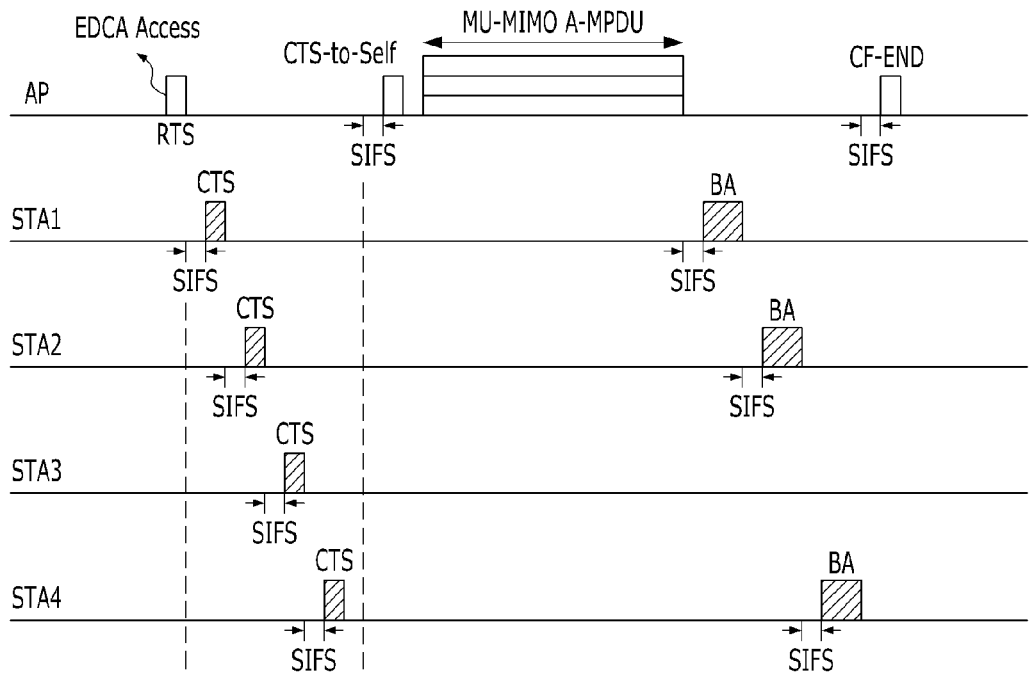
FIG. 4 illustrates a method for transmitting a frame in accordance with the present invention.

FIG. 4 illustrates a method for transmitting a frame using group control information in accordance with the present invention.

In general, a method for transmitting a frame by a WLAN includes steps of RTS/CTS/DATA/ACK. Transmission of a MU-MIMO data frame includes the same process.

Exchange of RTS/CTS frame is a function requested for the hidden-node problem and channel protection in the case of a frame having data longer than the RTS threshold. The RTS/CTS frame exchange process is still needed when transmitting data using MU-MIMO technology, and the RTS frame in this case includes group control information in the receiving STA address field. The group control information includes at least a group sequence number and bitmap information. When group control information is recorded in the receiving STA address field in this manner, a frame can be transmitted to multiple users without separate frame format modification or addition.

Wireless STAs having the same group sequence number transmit a CTS frame in response to a RTS frame at their response turns.

After RTS/CTS frame exchange, the AP transmits a CTS-to-Self frame, which may include updated group control information.

The AP transmits a MU-MIMO data frame using the updated group control information. Referring to FIG. 4, a total of four wireless STAs constitute the group included in the group control information. However, after the group control information is updated, it is three receiving STAs that receive the MU-MIMO data frame transmitted using the corresponding group sequence number. In other words, the bit regarding the third wireless STA in the STA bitmap of the group control information is set as '0' to have a bitmap of '1101', thereby indicating that no data frame is transmitted to the third wireless STA.

Each wireless STA uses the updated group control information, which is included in the CTS-to-Self frame, to subsequently transmit a block ACK frame in response to the data frame.

The destination address of each A-MPDU of the MU-MIMO data frame includes the MAC address of the corresponding wireless STA, and reception of data by multiple users is performed independently with regard to each beamformed A-MPDU. Grouping of wireless STAs supposed to receive data using MU-MIMO is determined based on a combination having good performance during simultaneous data frame transmission using MI-MUMO technology and a combination of QoS information of transmitted data.

A method for recovering a frame, which has failed to be transmitted to a specific user, when frames are transmitted to multiple users using the above-mentioned group control information will now be described.

The present invention is applicable to cases in which response frames to control frames, such as an ACK frame, a CTS frame, and a block ACK frame, have failed to be received normally.

Figure 5:
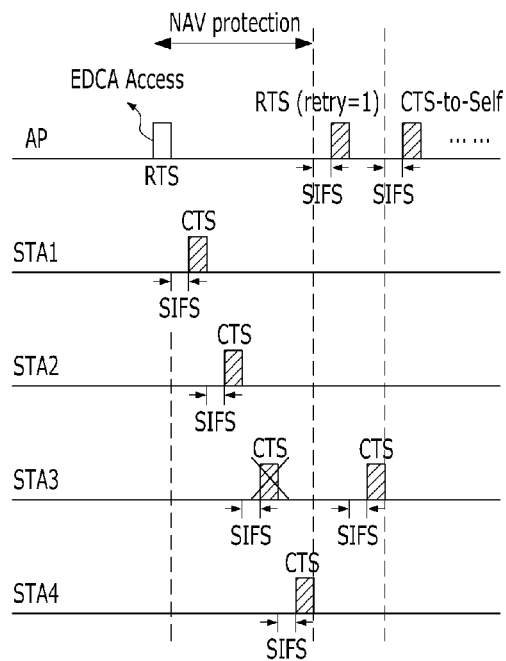
FIG. 5 illustrates a method for recovering a CTS frame, which has failed to be transmitted, in accordance with an embodiment of the present invention.

FIG. 5 illustrates a method for recovering a CTS frame, which has failed to be received in response to a RTS frame, in accordance with an embodiment of the present invention.

The AP records group control information in the receiving STA address field of a RTS frame and transmits the RTS frame to a plurality of wireless STAs that have been grouped. In this case, the AP transmits the RTS frame through EDCA.

As has been described with reference to FIG. 4, upon receiving the RTS frame including group control information in the receiving STA address field, the wireless STAs recognize the recipients using the group sequence number and bitmap information, and subsequently respond with CTS frames. However, wireless station STA3 may fail to transmit a CTS frame at its turn as illustrated in FIG. 5 and, as a result, the AP cannot receive a CTS frame from STA3. Consequently, there is a need for a method for recovering such a failure to receive a CTS frame from STA3.

Referring to FIG. 5, in accordance with an embodiment of the present invention, when a specific wireless STA fails to respond with a CTS frame, the channel is left unoccupied for a predetermined period of transmission time corresponding to the turn of the wireless STA. All CTS frames from other wireless STAs are received, and the NAV protection interval expires. Thereafter, a RTS frame is again transmitted only to the wireless STA, from which a CTS frame has failed to be received.

In other words, if STA3 illustrated in FIG. 5 fails to transmit a CTS frame, the channel is left unoccupied for a period of time, which is reserved for STA3 to transmit a CTS frame, and a CTS frame is received from STA4. In this case, other wireless STAs within the BSS are in the process of NAV protection by duration of a RTS frame. After receiving a CTS frame from the last STA, the AP retransmits a RTS frame only to STA3, from which a CTS frame has failed to be received, after SIFS. The bitmap of group control information included in the receiving STA address field of the retransmitted RTS frame has a bit, which corresponds to none other than STA3, set as '1'. It is also possible that the AP records the address of STA3 in the receiving STA address field of the retransmitted RTS frame and then transmits the RTS frame.

Figure 6:
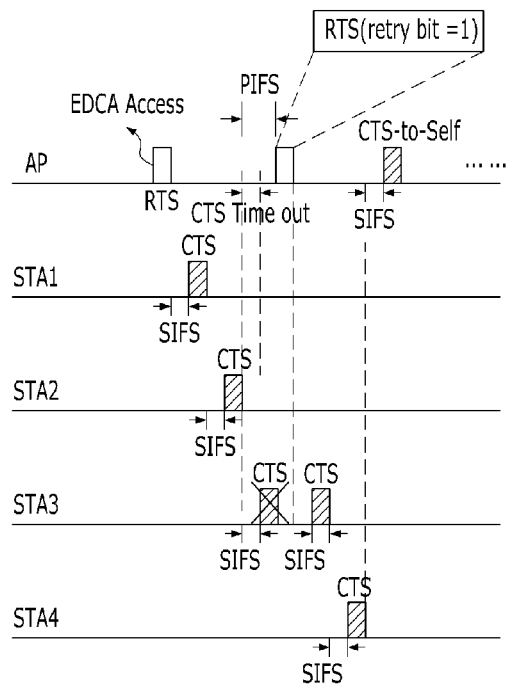
FIG. 6 illustrates a method for recovering a CTS frame, which has failed to be transmitted, in accordance with another embodiment of the present invention.

FIG. 6 illustrates a method for recovering a CTS frame, which has failed to be transmitted, in accordance with another embodiment of the present invention. Specifically, FIG. 6 corresponds to a case of failed transmission of a CTS frame regarding STA3.

Another embodiment of the present invention, which will now be described, is different from the above-mentioned embodiment in which, when there is no response to a CTS frame, the channel is left unoccupied for a predetermined period of transmission time reserved for the corresponding turn. To the contrary, when a CTS frame fails to be received at a predetermined turn and thus causes CTS timeout, the AP retransmits RTS frames to all wireless STAs coming after the wireless STA, from which no CTS frame has been received, and preparing to transmit CTS frames.

In other words, when a CTS frame fails to be received from STA3 and results in CTS timeout as illustrated in FIG. 6, the AP retransmits RTS frames to STA3 and STA4.

As such, another embodiment of the present invention is aimed at solving the hidden node problem, which may become severer when MU-MIMO technology is applied, even if other wireless STAs within the BSS are performing NAV protection by means of RTS frames.

The bitmap of group control information included in the receiving STA address field of the RTS frame, which is retransmitted from the AP, has bits, which correspond to none other than STA3 and STA4, set to '1'.

A method for recovering a BA frame, which has failed to be received in response to a frame transmitted using group control information will now be described. The method for recovering a CTS frame, which has failed to be transmitted in response to a RTS frame, described with reference to FIGS. 5 and 6 is also applicable to a method for recovering a BA frame.

Figure 7:
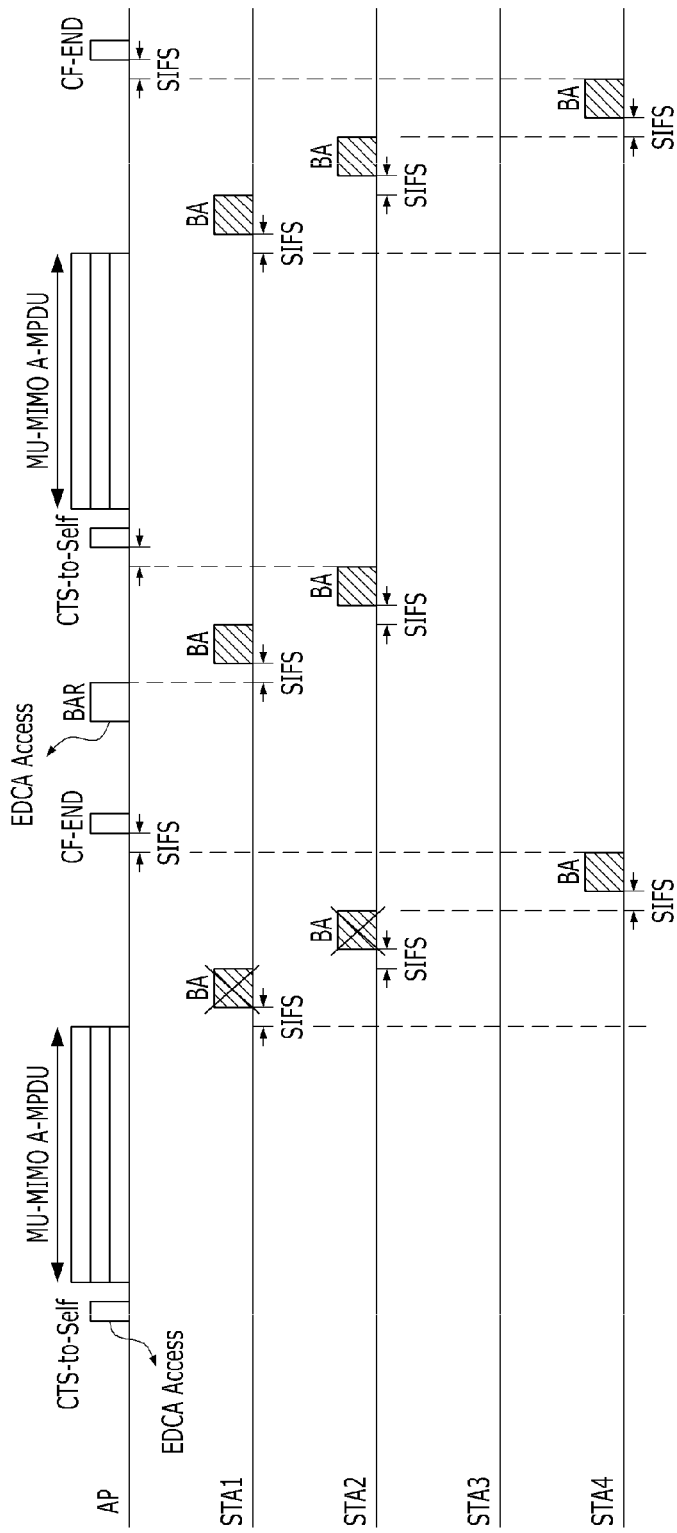
FIG. 7 illustrates a method for recovering a block ACK frame, which has failed to be transmitted, in accordance with the present invention.

FIG. 7 illustrates a method for recovering a BA frame, which has failed to be transmitted, in accordance with an embodiment of the present invention.

According to the method for recovering a BA frame in accordance with an embodiment of the present invention illustrated in FIG. 7, after waiting for all wireless STAs to transmit ACK frames, including the time for transmission of BA frames that have failed to be received as in the case of the CTS frame recover method described with reference to FIG. 5. Then, BAR frames are transmitted to wireless STAs, from which no BA frames have been received, to request them to transmit BA frames.

Specifically, FIG. 7 illustrates a case in which the AP transmits a data frame (MU-MIMO A-MPDU) to STA1, STA2, and STA4 using group control information and fails to receive BA frames from STA1 and STA2.

The AP then waits for a BA frame to be received from the last wireless STA (i.e. STA4), and transmits BAR frames to STA1 and STA2, which have failed to transmit BA frames, through cannel access.

The receiving STA address of the transmitted BAR frame is group control information including a bitmap indicating STA1 and STA2, which are required to retransmit BA frames. It is also possible to record the address of wireless STAs, which have failed to transmit, in the receiving STA address of the BAR frame and transmit the BAR frame to each wireless STA.

The BAR control information and BAR information, which the BAR frame basically includes, concerns one receiving STA. Therefore, when group control information is used to provide a BAR function regarding multiple users, and when multiple users who have received a data frame (MU-MIMO A-MPDU) have common information, the BAR control information and BAR information fields are filled with common information. However, if each of multiple users has a different BA-related value, the BAR control information and BAR information fields are filled with null values.

When a data frame (MU-MIMO A-MPDU) including one piece of group control information is transmitted in FIG. 7, the group control transmission process is completed by receiving all BA frames from multiple users. If there is no change in the multiple user group combination, the present invention can reconfigure the wireless STA bitmap and transmit the next data frame (MU-MIMO A-MPDU). As such, use of group control information by the present invention makes it unnecessary to record all addresses for multiple users in frames, thus reducing overhead of multiple user frames.

It has been assumed in the above-described embodiments of the present invention that group control information is recorded in the receiving STA address field of the frame. However, those skilled in the art can understand that, instead of being recorded in the receiving STA address field, group control information may be included as control information in various frames that can be exchanged between wireless STAs using MU-MIMO technology.

Operation cases of containing control information in various frames will now be described.

Figure 8:
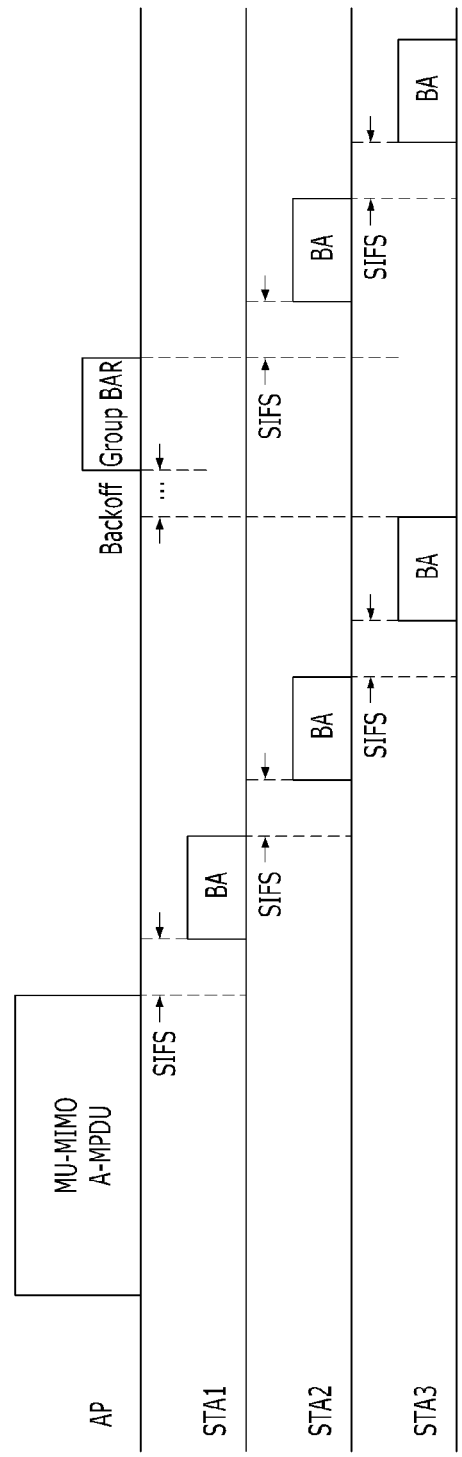
FIGS. 8 and 9 illustrate methods for recovering a block ACK frame, which has failed to be transmitted, using a group BAR frame in accordance with the present invention.
Figure 9:
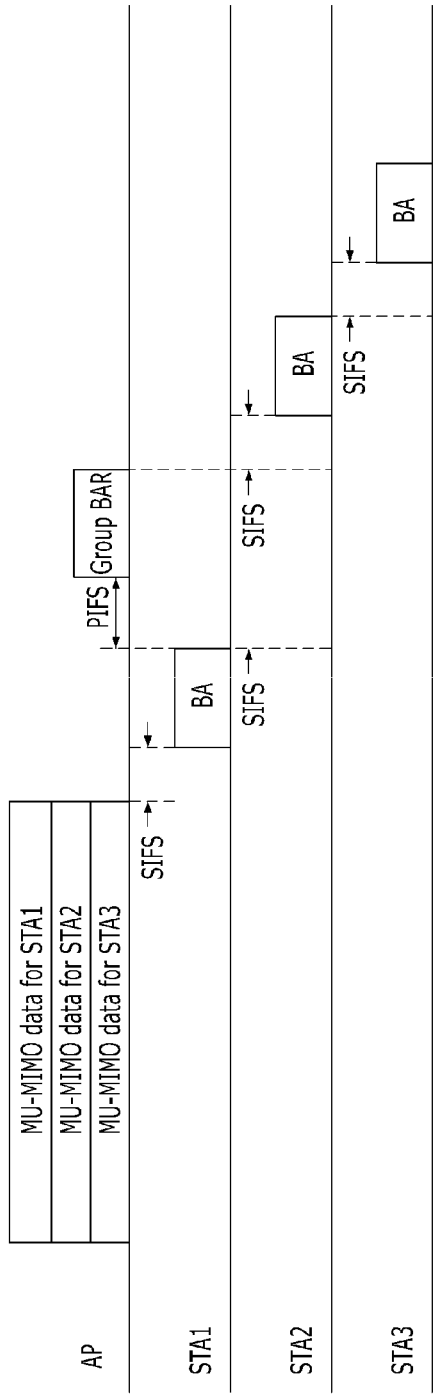

FIGS. 8 and 9 illustrate a method for recovering a BA frame, which has failed to be transmitted, using a group BAR frame in accordance with the present invention.

Referring to FIG. 8, a data frame is transmitted to multiple users, and BA frames fail to be received from STA2 and STA3. Then, the AP performs backoff after expiration of time for transmission of BA frames by all wireless STAs, and transmits group BAR frames, specifically, to STA2 and STA3, from which BA frames have failed to be received.

Referring to FIG. 9, a data frame is transmitted to multiple users, and a BA frame fails to be received from STA2. Then, the AP transmits a group BAR frame after PIFS. The group BAR frame is a block ACK request frame directed to STA2, from which a BA frame has failed to be received, and to ST3, which comes after STA2.

The group BAR frame in FIGS. 8 and 9 may include group information and receiving STA information, and may be used to adjust the BA response schedule according to radio environment.

Figure 10:
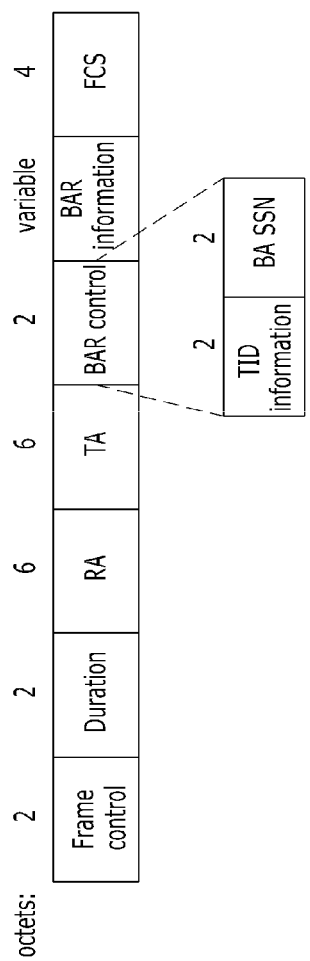
FIG. 10 illustrates a group BAR using a multiple-TID BAR structure in accordance with an embodiment of the present invention.

Meanwhile, the group BAR frame can be constructed using a receiving STA address field and a BAR information field using a multiple-TID BAR type, among existing BAR frame formats, as illustrated in FIG. 10.

Referring to FIG. 10, the group BAR frame is constructed by recording group information in the receiving STA address (RA) field of existing BAR frame format, and by recording each STA's TID information (AID) and BA SSN (Starting Sequence Number) in the BAR information field.

Such expression of a group BAR frame for group control using existing BAR frame format is based on the assumption that wireless STAs can know this from BAR control information, or a wireless STA, which has recognized that the receiving STA address is group information, can understand the frame format.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention is applicable to technology for recovering a frame, which has failed to be transmitted, among frames transmitted to a plurality of wireless STAs using group numbers in a MU-MIMO-based wireless communication system.

What is claimed is:

1. A communication method comprising:
receiving a sounding frame at a station;
generating a feedback based on the sounding frame at the station;
transmitting a feedback frame comprising the feedback at the station;
receiving a first frame at the station, the first frame including a first field indicating that the station belongs to a first group of a plurality of stations;
receiving a first part of a second frame at the station, wherein the first part of the second frame comprises a group identifier identifying the first group;
determining, at the station, that the group identifier corresponds to the first group; and
receiving a second part of the second frame at the station, wherein the second part of the second frame comprises an aggregated media access control protocol data unit (A-MPDU).

2. The method of claim 1, wherein whether the station belongs to the first group or not is determined, after transmission of the feedback frame, based on the feedback in the feedback frame.

3. The method of claim 1, wherein the first frame is received in response to transmission of the feedback frame.

4. The method of claim 1, wherein:
the first field includes a plurality of bits;
each bit of the plurality of bits corresponds to one group of a plurality of groups including the first group; and
each bit of the plurality of bits indicates whether or not the station is a member of a corresponding group of the plurality of groups.

5. The method of claim 1, wherein:
the first part of the second frame comprises information relating to at least one spatial stream for the station, and the A-MPDU is received at the station at least based on the information relating to the at least one spatial stream.

6. The method of claim 5, wherein the information relating to the at least one spatial stream indicates a spatial stream location for the station.

7. The method of claim 1, wherein the first group is determined based on the feedback frame.

8. A station, comprising:
a circuitry which is configured to:
cause the station to receive a sounding frame at a station;
cause the station to generate a feedback based on the sounding frame at the station;
cause the station to transmit a feedback frame comprising the feedback at the station;
cause the station to receive a first frame at the station, the first frame including a first field indicating that the station belongs to a first group of a plurality of stations;
cause the station to receive a first part of a second frame at the station, wherein the first part of the second frame comprises a group identifier identifying the first group;
determine that the group identifier corresponds to the first group; and
cause the station to receive a second part of the second frame at the station, wherein the second part of the second frame comprises an aggregated media access control protocol data unit (A-MPDU).

9. The station of claim 8, wherein whether the station belongs to the first group or not is determined, after transmission of the feedback frame, based on the feedback in the feedback frame.

10. The station of claim 8, wherein the first frame is received in response to transmission of the feedback frame.

11. The station of claim 8, wherein:
the first field includes a plurality of bits;
each bit of the plurality of bits corresponds to one group of a plurality of groups including the first group; and
each bit of the plurality of bits indicates whether or not the station is a member of a corresponding group of the plurality of groups.

12. The station of claim 8, wherein:
the first part of the second frame comprises information relating to at least one spatial stream for the station, and the A-MPDU is received at the station at least based on the information relating to the at least one spatial stream.

13. The station of claim 12, wherein the information relating to the at least one spatial stream indicates a spatial stream location for the station.

14. The station of claim 8, wherein the wherein the first group is determined based on the feedback frame.

15. A communication device for a station, comprising:
a circuitry which is configured to:
cause the station to receive a sounding frame at a station;
cause the station to generate a feedback based on the sounding frame at the station;
cause the station to transmit a feedback frame comprising the feedback at the station;
cause the station to receive a first frame at the station, the first frame including a first field indicating that the station belongs to a first group of a plurality of stations;
cause the station to receive a first part of a second frame at the station, wherein the first part of the second frame comprises a group identifier identifying the first group;
determine that the group identifier corresponds to the first group; and
cause the station to receive a second part of the second frame at the station, wherein the second part of the second frame comprises an aggregated media access control protocol data unit (A-MPDU).

16. The communication device of claim 15, wherein whether the station belongs to the first group or not is determined, after transmission of the feedback frame, based on the feedback in the feedback frame.

17. The communication device of claim 15, wherein the first frame is received in response to transmission of the feedback frame.

18. The communication device of claim 15, wherein:
the first field includes a plurality of bits;
each bit of the plurality of bits corresponds to one group of a plurality of groups including the first group; and
each bit of the plurality of bits indicates whether or not the station is a member of a corresponding group of the plurality of groups.

19. The communication device of claim 15, wherein:
the first part of the second frame comprises information relating to at least one spatial stream for the station, and the A-MPDU is received at the station at least based on the information relating to the at least one spatial stream.

20. The communication device of claim 19, wherein the information relating to the at least one spatial stream indicates a spatial stream location for the station.

21. The communication device of claim 15, wherein the wherein the first group is determined based on the feedback frame.

* * * * *